US008570760B2

(12) United States Patent
Chen

(10) Patent No.: US 8,570,760 B2
(45) Date of Patent: Oct. 29, 2013

(54) SERIAL ADVANCED TECHNOLOGY ATTACHMENT DUAL IN-LINE MEMORY MODULE DEVICE ASSEMBLY

(75) Inventor: Guo-Yi Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 206 days.

(21) Appl. No.: 13/192,362

(22) Filed: Jul. 27, 2011

(65) Prior Publication Data

US 2013/0016471 A1 Jan. 17, 2013

(30) Foreign Application Priority Data

Jul. 15, 2011 (CN) .......................... 2011 1 0198123

(51) Int. Cl.
*G06F 1/16* (2006.01)

(52) U.S. Cl.
USPC ...... 361/760; 361/679.31; 361/785; 361/801; 439/65

(58) Field of Classification Search
USPC ........... 361/728, 736, 737, 760, 784–88, 801, 361/679.31; 439/65
See application file for complete search history.

(56) References Cited

U.S. PATENT DOCUMENTS

| | | | | |
|---|---|---|---|---|
| 7,044,801 | B2 * | 5/2006 | Park | 439/638 |
| 7,746,665 | B2 * | 6/2010 | Junkins et al. | 361/801 |
| 8,137,128 | B2 * | 3/2012 | Hsueh et al. | 439/499 |
| 8,432,708 | B2 * | 4/2013 | Chen et al. | 361/803 |
| 2006/0276083 | A1 * | 12/2006 | Sun | 439/638 |
| 2011/0063790 | A1 * | 3/2011 | Park et al. | 361/679.31 |
| 2011/0235260 | A1 * | 9/2011 | Lee et al. | 361/679.32 |
| 2013/0088843 | A1 * | 4/2013 | Cong et al. | 361/785 |

* cited by examiner

*Primary Examiner* — Anatoly Vortman
*Assistant Examiner* — Jacob Crum
(74) *Attorney, Agent, or Firm* — Altis & Wispro Law Group, Inc.

(57) ABSTRACT

A serial advanced technology attachment dual-in-line memory module (SATA DIMM) device assembly includes an interface, a cable, and a board. An edge connector is set on a bottom edge of the board, and a control chip and a connector are arranged on the board. The connector includes a first shell and a number of first pins. The first pins include signal pins connected to the control chip, and ground pins. The interface includes a second shell and a connecting portion extended from a bottom of the second shell. A number of second pins are arranged on the connecting portion. The cable is extended through a side of the second shell to be connected to the first pins. A distance between a top of the first shell and a top of the board is greater than a height of the second shell.

4 Claims, 3 Drawing Sheets

100

SERIAL ADVANCED TECHNOLOGY ATTACHMENT DUAL IN-LINE MEMORY MODULE DEVICE ASSEMBLY

CROSS-REFERENCE OF RELATED APPLICATION

Relevant subject matter is disclosed in a co-pending U.S. patent application with application Ser. No. 13/172,603, filed on Jun. 29, 2011, with the same title "SERIAL ADVANCED TECHNOLOGY ATTACHMENT DIMM", which are assigned to the same assignee as this patent application.

BACKGROUND

1. Technical Field

The present disclosure relates to a serial advanced technology attachment dual in-line memory module (SATA DIMM) device assembly.

2. Description of Related Art

Solid state drives (SSD) store data on chips instead of on magnetic or optical discs. One type of SSD has the form factor of a DIMM and it is called a SATA DIMM device. The SATA DIMM device can be inserted into a memory slot of a motherboard, to receive voltages from the motherboard through the memory slot. However, hard disk drive (HDD) signals need to be transmitted between the SATA DIMM device and the motherboard through SATA connectors arranged on the SATA DIMM device and connected to a SATA connector of the motherboard. When the SATA DIMM device is inserted into a memory slot of the motherboard, the SATA connector of the SATA DIMM device is connected to the SATA connector of the motherboard, which may bring some physical interference with the computer chassis, therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by limitation. References to "an" or "one" embodiment in this disclosure are not necessarily to the same embodiment, and such references mean at least one.

Figure 1:
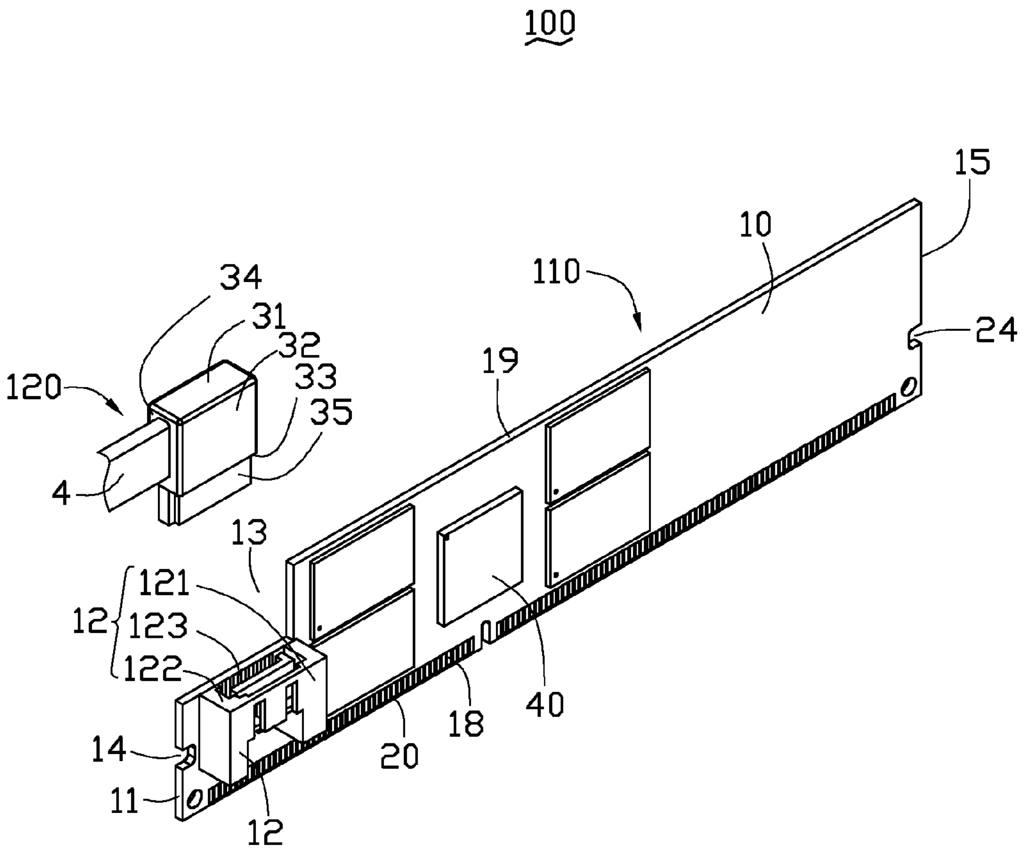
FIG. 1 is a schematic diagram of a serial advanced technology attachment dual in-line memory module (SATA DIMM) device assembly in accordance with an exemplary embodiment of the present disclosure, the SATA DIMM device assembly includes a cable member and a SATA DIMM device.
Figure 2:
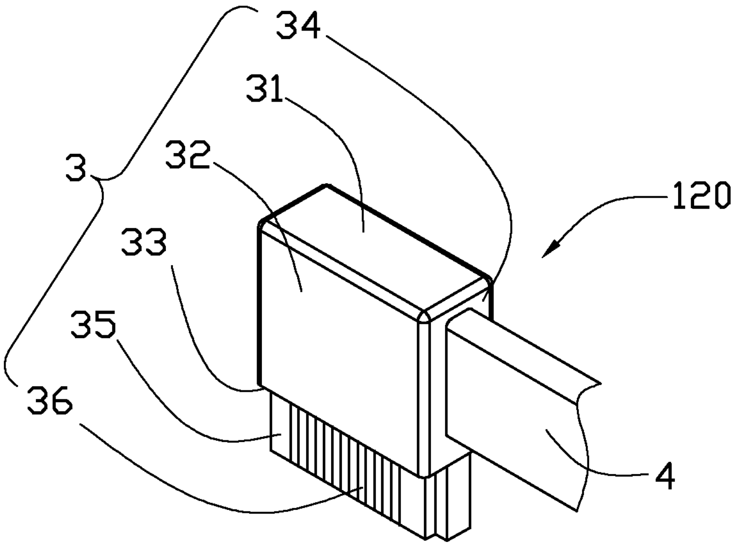
FIG. 2 is another view of the cable member of FIG. 1.
Figure 3:
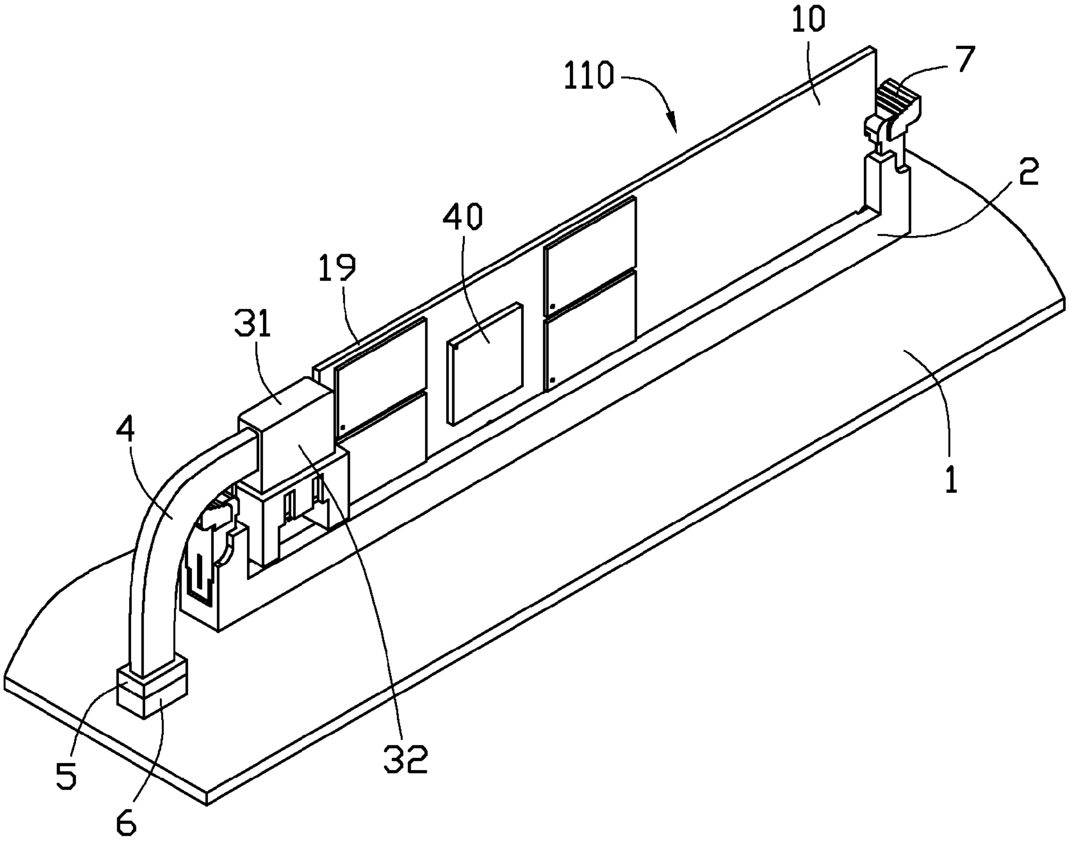
FIG. 3 is a schematic diagram of the SATA DIMM device assembly of FIG. 1 connected to a motherboard.

Referring to FIGS. 1 to 3, a serial advanced technology attachment dual-in-line memory module (SATA DIMM) device assembly 100 in accordance with an exemplary embodiment includes a SATA DIMM device 110 and a cable member 120. The cable member 120 includes an interface 3 and a cable 4 connected to the interface 3. The interface 3 includes a shell 32 and a connecting portion 35 extended from a bottom 33 of the shell 32. A plurality of pins 36 is arranged on the connecting portion 35. The pins 36 include a pair of signal input pins, a pair of signal output pins, and three ground pins. The cable 4 extends through a side 34 of the shell 32 adjacent to the bottom 33 to be electrically connected to the pins 36. In one embodiment, the interface 3 is a SATA connector.

The SATA DIMM device 110 includes a board 10. A control chip 40 is arranged on a center of the board 10. A connector 12 is arranged on a bottom left corner of the board 10. The connector 12 includes a shell 121 and a plurality of pins 123 arranged inside the shell 121. The pins 123 include a plurality of signal pins and a plurality of ground pins. The signal pins include a pair of signal input pins and a pair of signal output pins. The ground pins include three ground pins. The signal input pins and the signal output signals are connected to the control chip 40. The ground pins are connected to a ground layer (not shown) of the board 10. A distance between a top 122 of the shell 121 and a top 19 of the board 10 is greater than or equal to a height of the shell 32. In one embodiment, the connector 12 accords with the SATA standard.

A gap 13 is defined in a top left corner of the board 10, above the connector 12. An edge connector 18 is arranged on a bottom 20 of the board 10, to be inserted into a memory slot 2 of a motherboard 1. Two grooves 14 and 24 are defined in opposite ends 11 and 15 of the board 10, respectively.

In use, the edge connector 18 is inserted into the memory slot 2. Two fixing elements 7 of the memory slot 2 engage in the grooves 14 and 24, respectively, to fix the SATA DIMM device 110 to the memory slot 2. The connecting portion 35 of the interface 3 is inserted into the connector 12. The top 31 of the interface 3 is lower than or coplanar with the top 19 of the board 10, and the cable 4 is lower than the top 19, to avoid physical interference between the cable member 120 and the chassis. The cable 4 is connected to the motherboard 1 through an interface 5 of the cable 4 opposite to the interface 3 and an interface 6 of the motherboard 1.

When the motherboard 1 receives power, the motherboard 1 outputs a voltage to the SATA DIMM device 110 through the memory slot 2 and the edge connector 18. At the same time, the motherboard 1 outputs a hard disk drive (HDD) signal to the control chip 40 through the interfaces 6 and 5, the cable 4, the interface 3, and the connector 12, to communicate with the SATA DIMM device 110.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A serial advanced technology attachment dual-in-line memory module (SATA DIMM) device assembly, comprising:

a SATA DIMM device comprising:

a board comprising an edge connector set on a bottom edge of the board, wherein the edge connector comprises a plurality of power pins;

a control chip arranged on the board and connected to the plurality of power pins to receive a voltage; and a connector comprising a rectangular first shell, wherein an access is defined in a top of the first shell, a plurality of first pins arranged at a side of the first shell and exposed through the access, the connector is connected to the board through the plurality of first pins, the plurality of first pins comprising a plurality of signal pins connected to the control chip, and a plurality of ground pins; and a cable member comprising:

an interface comprising a second shell and a connecting portion extended from a bottom of the second shell, wherein a plurality of second pins is arranged on the connecting portion; and a cable extending through a side of the second shell adjacent to the bottom of the second shell to be electrically connected to the plurality of second pins, wherein a distance between the top of the first shell of the connector and a top of the board is greater than or equal to a height of the second shell of the interface;

wherein the connector is arranged on a bottom left corner of the board, a gap is defined in a top left corner of the board, above the connector, and when the connecting portion of the interface extends through the access of the connector, a top of the interface is lower than or coplanar with the top of the board.

2. The SATA DIMM device assembly of claim 1, wherein the interface of the cable member is a serial advanced technology attachment (SATA) connector, the connector of the board accords with a SATA standard.

3. The SATA DIMM device assembly of claim 1, wherein the plurality of first pins of the connector comprises a pair of signal input pins, a pair of signal output pins, and three ground pins.

4. The SATA DIMM device assembly of claim 1, wherein the plurality of second pins of the interface comprises a pair of signal input pins, a pair of signal output pins, and three ground pins.

* * * * *